(12) United States Patent
Jose et al.

(10) Patent No.: US 11,449,456 B2
(45) Date of Patent: Sep. 20, 2022

(54) SYSTEM AND METHOD FOR SCHEDULING SHARABLE PCIE ENDPOINT DEVICES

(71) Applicant: Microchip Technology Inc., Chandler, AZ (US)

(72) Inventors: Derin Jose, Thrissur (IN);
Sachindranath Pv, Kannur (IN);
Viswas G, Kannur (IN)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 17/151,316

(22) Filed: Jan. 18, 2021

(65) Prior Publication Data

US 2021/0374086 A1 Dec. 2, 2021

Related U.S. Application Data

(60) Provisional application No. 63/033,216, filed on Jun. 2, 2020.

(51) Int. Cl.
*G06F 13/20* (2006.01)
*G06F 13/42* (2006.01)
*G06F 13/362* (2006.01)
*G06F 13/10* (2006.01)
*G06F 9/50* (2006.01)
*G06F 9/48* (2006.01)
*G06F 13/40* (2006.01)

(52) U.S. Cl.
CPC ........ *G06F 13/4221* (2013.01); *G06F 9/4837* (2013.01); *G06F 9/5027* (2013.01); *G06F 13/105* (2013.01); *G06F 13/3625* (2013.01); *G06F 13/404* (2013.01); *G06F 2213/0026* (2013.01)

(58) Field of Classification Search
CPC ...... G06F 13/00; G06F 9/4837; G06F 9/5027; G06F 13/4221; G06F 13/105; G06F 13/3625; G06F 13/404; G06F 2213/0026
See application file for complete search history.

(56) References Cited

U.S. PATENT DOCUMENTS 9,323,635 B2 4/2016 Ge
9,984,017 B2 5/2018 Nair
10,162,792 B2 12/2018 Shao et al.
(Continued)

OTHER PUBLICATIONS

PCT/US2021/021223, International Search Report and Written Opinion, European Patent Office, dated Jun. 25, 2021.

*Primary Examiner* — Henry Tsai
*Assistant Examiner* — Kim T Huynh
(74) *Attorney, Agent, or Firm* — Glass and Associates; Kenneth Glass; Molly Sauter

(57) ABSTRACT

System and method for sharing a PCIe endpoint device with a plurality of host computers, by allocating a quantum of time to a host computer of a plurality of host computers coupled to a PCIe switch, wherein the quantum of time identifies a duration of time during which the host computer has exclusive access to a shareable PCIe endpoint device coupled to the PCIe switch. Requests from the host computer are transmitted to an emulated PCIe endpoint device of the PCIe switch during the quantum of time and the requests are then redirected from the emulated PCIe endpoint device to the shareable PCIe endpoint device during the quantum of time allocated to the host computer.

19 Claims, 9 Drawing Sheets

(56) References Cited

U.S. PATENT DOCUMENTS

| | | | |
|---|---|---|---|
| 10,387,356 B1* | 8/2019 | Frick | G06F 13/4221 |
| 2010/0312942 A1* | 12/2010 | Blinick | G06F 13/4022 |
| | | | 710/316 |
| 2012/0166690 A1 | 6/2012 | Regula | |
| 2013/0024595 A1 | 1/2013 | Subramaniyan et al. | |
| 2015/0254202 A1* | 9/2015 | Mcglone | G06F 1/3278 |
| | | | 710/316 |
| 2016/0154756 A1 | 6/2016 | Dodson et al. | |
| 2017/0147456 A1* | 5/2017 | Lee | G06F 11/2033 |
| 2018/0321985 A1 | 11/2018 | Kakaiya et al. | |
| 2019/0132198 A1* | 5/2019 | Li | G06F 9/30134 |
| 2020/0192848 A1* | 6/2020 | Maroney | G06F 12/0284 |
| 2021/0374086 A1* | 12/2021 | Jose | G06F 9/5027 |

\* cited by examiner

500

```
┌─────────────────────────────────────────────────────────────────┐
│ SELECTING, BY A MANAGEMENT SERVER ASSOCIATED WITH THE PCIE      │
│ SWITCH, A HOST COMPUTER OF THE PLURALITY OF HOST COMPUTERS AND A│
│ QUANTUM OF TIME TO BE ALLOCATED TO THE SELECTED HOST COMPUTER   │
│                              505                                │
└─────────────────────────────────────────────────────────────────┘
                                 │
                                 ▼
┌─────────────────────────────────────────────────────────────────┐
│ TRANSMITTING A HOST PORT ID ASSOCIATED WITH THE SELECTED HOST   │
│ COMPUTER AND THE QUANTUM OF TIME TO BE ALLOCATED TO THE         │
│ SELECTED HOST COMPUTER TO A SHAREABLE PCIE ENDPOINT DEVICE      │
│                              510                                │
└─────────────────────────────────────────────────────────────────┘
                                 │
                                 ▼
┌─────────────────────────────────────────────────────────────────┐
│ GENERATING A START OF QUANTUM OF TIME SIGNAL AT THE SHAREABLE PCIE│
│                        ENDPOINT DEVICE                          │
│                              515                                │
└─────────────────────────────────────────────────────────────────┘
                                 │
                                 ▼
┌─────────────────────────────────────────────────────────────────┐
│ TRANSMITTING THE START OF QUANTUM OF TIME SIGNAL FROM THE       │
│ SHAREABLE PCIE ENDPOINT DEVICE TO THE MANAGEMENT SERVER         │
│                              520                                │
└─────────────────────────────────────────────────────────────────┘
                                 │
                                 ▼
┌─────────────────────────────────────────────────────────────────┐
│ GENERATING A FIRST INTERRUPT AT THE MANAGEMENT SERVER IN RESPONSE│
│ TO RECEIVING THE START OF QUANTUM TIME SIGNAL FROM THE SHAREABLE│
│                        PCIE ENDPOINT DEVICE                     │
│                              525                                │
└─────────────────────────────────────────────────────────────────┘
                                 │
                                 ▼
┌─────────────────────────────────────────────────────────────────┐
│         TRANSMITTING THE FIRST INTERRUPT TO THE HOST COMPUTER   │
│                              530                                │
└─────────────────────────────────────────────────────────────────┘
                                 │
                                 ▼
┌─────────────────────────────────────────────────────────────────┐
│ GENERATING REQUESTS, AT THE HOST COMPUTER, TARGETING            │
│ THE BAR-MAPPED REGION OF THE EMULATED PCIE ENDPOINT    ──► TO STEP 540
│ DEVICE IN RESPONSE TO THE FIRST INTERRUPT                  IN FIG. 6
│                              535                                │
└─────────────────────────────────────────────────────────────────┘
```

FIG. 5

SYSTEM AND METHOD FOR SCHEDULING SHARABLE PCIE ENDPOINT DEVICES

CROSS-REFERENCE TO RELATED APPLICATIONS

The present application claims priority to U.S. Provisional Patent Application Ser. No. 63/033,216, filed on Jun. 2, 2020, the contents of which are incorporated by reference herein in their entirety.

BACKGROUND OF THE INVENTION

Peripheral Component Interconnect Express (PCIe) is a third generation Input Output (3GIO) system that implements a serial, switched-packet, point-to-point communication standard at the system level. PCIe has achieved many advantages over the prior shared bus system, such as quality of service (QoS), high speed peer-to-peer communication between external devices, adaptability and low pin count. The basic PCIe architecture may include a root complex, a PCIe switch and PCIe endpoint devices. The root complex is generally associated with a processor and is responsible for configuring the switch fabric by executing an enumeration process at power-up. Since PCIe connections are point-to-point, PCIe switches are used to expand the switch fabric.

The full potential of PCIe endpoint devices are only utilized by the system software of the PCIe switch fabric during peak workloads. For example, if a PCIe endpoint device, including, but not limited to, a raid controller card or a network card, is being used for enabling access to storage media within a storage area network (SAN) environment, the average performance utilization of the PCIe endpoint device will vary between 10%-20% of the actual throughput that can be delivered by the PCIe endpoint device.

Accordingly, what is need in the art is a system and method for improving the utilization of the processing capability of PCIe endpoint devices.

SUMMARY OF THE INVENTION

The present invention relates to Peripheral Component Interconnect Express (PCIe) devices. More particularly, the present invention relates to the management of PCIe endpoint devices that are shared between two or more host computers. In various embodiments, the present invention enables the software running on a management server of a PCIe switch to efficiently use the available computation and processing power available in the PCIe endpoint devices coupled to the PCIe switch to save power and cost.

A method of sharing a PCIe endpoint device with a plurality of host computers is disclosed that includes allocating, by a management server, a first quantum of time to a first host computer of a plurality of host computers coupled to a PCIe switch, wherein the first quantum of time identifies a duration of time during which the first host computer has exclusive access to send memory transaction layer packets (TLPs) to a shareable PCIe endpoint device coupled to the PCIe switch. The method includes generating memory TLPs, at the first host computer, targeting a first emulated PCIe endpoint device of the PCIe switch during the first quantum of time allocated to the first host computer and redirecting the memory TLPs targeting the first emulated PCIe endpoint device to the shareable PCIe endpoint device during the first quantum of time allocated to the first host computer. The method further includes allocating, by the management server, a second quantum of time to a second host computer of the plurality of host computers, wherein the second quantum of time identifies a duration of time during which the second host computers has exclusive access to send memory TLPs to the shareable PCIe endpoint device; generating memory TLPs, at the second host computer, targeting a second emulated PCIe endpoint device of the PCIe switch during the second quantum of time allocated to the second host computer; and redirecting the memory TLPs targeting the second emulated PCIe endpoint device to the shareable PCIe endpoint device during the second quantum of time allocated to the second host computer.

A system for sharing a PCIe endpoint device with a plurality of host computers is disclosed. The system includes a PCIe switch and a plurality of host computers coupled to the PCIe switch. The plurality of host computers include a first host computer and a second host computer. The PCIe switch provides an emulated PCIe endpoint device associated with each of the plurality of host computers. The system further includes, a shareable PCIe endpoint device coupled to the PCIe switch and a management server coupled to the PCIe switch. The management server establishes a first emulated PCIe endpoint device and a second emulated PCIe endpoint device within the PCIe switch, allocates a first quantum of time to the first host computer, wherein the first quantum of time identifies a duration of time during which the first host computer has exclusive access to send memory TLPs to the shareable PCIe endpoint device and allocates a second quantum of time to the second host computer, wherein the second quantum of time identifies a duration of time during which the second host computer has exclusive access to send memory TLPs to the shareable PCIe endpoint device. The PCIe switch is to redirect memory TLPs generated from the first host computer targeting the first emulated PCIe endpoint device to the shareable PCIe endpoint device during the first quantum of time and to redirect memory TLPs generated from the second host computer targeting the second emulated PCIe endpoint device to the shareable PCIe switch during the second quantum of time.

In an exemplary embodiment, the shareable PCIe endpoint device further includes, a PCIe configuration space exposing a PCIe vendor defined scheduling control capability to the management server, the PCIe configuration space further comprising a R/W processing unit having BAR-mapped regions, wherein the R/W processing unit converts a memory TLP received at the shareable PCIe endpoint device into a R/W request. The shareable PCIe endpoint device further includes, a host ID appending unit coupled to the R/W processing unit, the host ID appending unit to append a host port ID associated with the host computer to the R/W request to generate a R/W request with host ID, a functionality stack switching module coupled to the host ID appending unit, the functionality stack switching module for switching to a functionality stack associated with the host computer. using a BAR-mapped region copy of the functionality stack and the functionality stack comprising a host ID to DMA address appending module to prefix the host port ID to a DMA address for forwarding to the host computer.

The present invention provides an improved system and method for sharing a PCIe endpoint device with a plurality of host computers over a PCIe switch.

BRIEF DESCRIPTION OF THE DRAWING FIGURES

The invention will be explained in more detail in the following with reference to embodiments and to the drawing in which are shown:

FIG. 5 is a flow diagram illustrating a first portion of a detailed method for allowing multiple host computers exclusive access to a shareable PCIe endpoint device during a specific quantum of time, in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In various embodiments, the proposed system and method provides for sharing a single PCIe endpoint device between multiple host computers using a PCIe switch. Time-based scheduling of the shareable PCIe endpoint device is facilitated by routing techniques implemented within the PCIe switch and by an enhanced switching capability implemented within the shareable PCIe endpoint device. Software running on a management server associated with the PCIe switch is responsible for scheduling the shareable PCIe endpoint device connected to a downstream port of the PCIe switch between multiple host computers connected to upstream ports of the PCIe switch. The quantum of time allocated to each of the host computers for accessing the shareable PCIe endpoint device do not overlap and as such, each of the multiple host computers is allowed exclusive access to the shareable PCIe endpoint device during the quantum of time allocated to that host computer.

Figure 1:
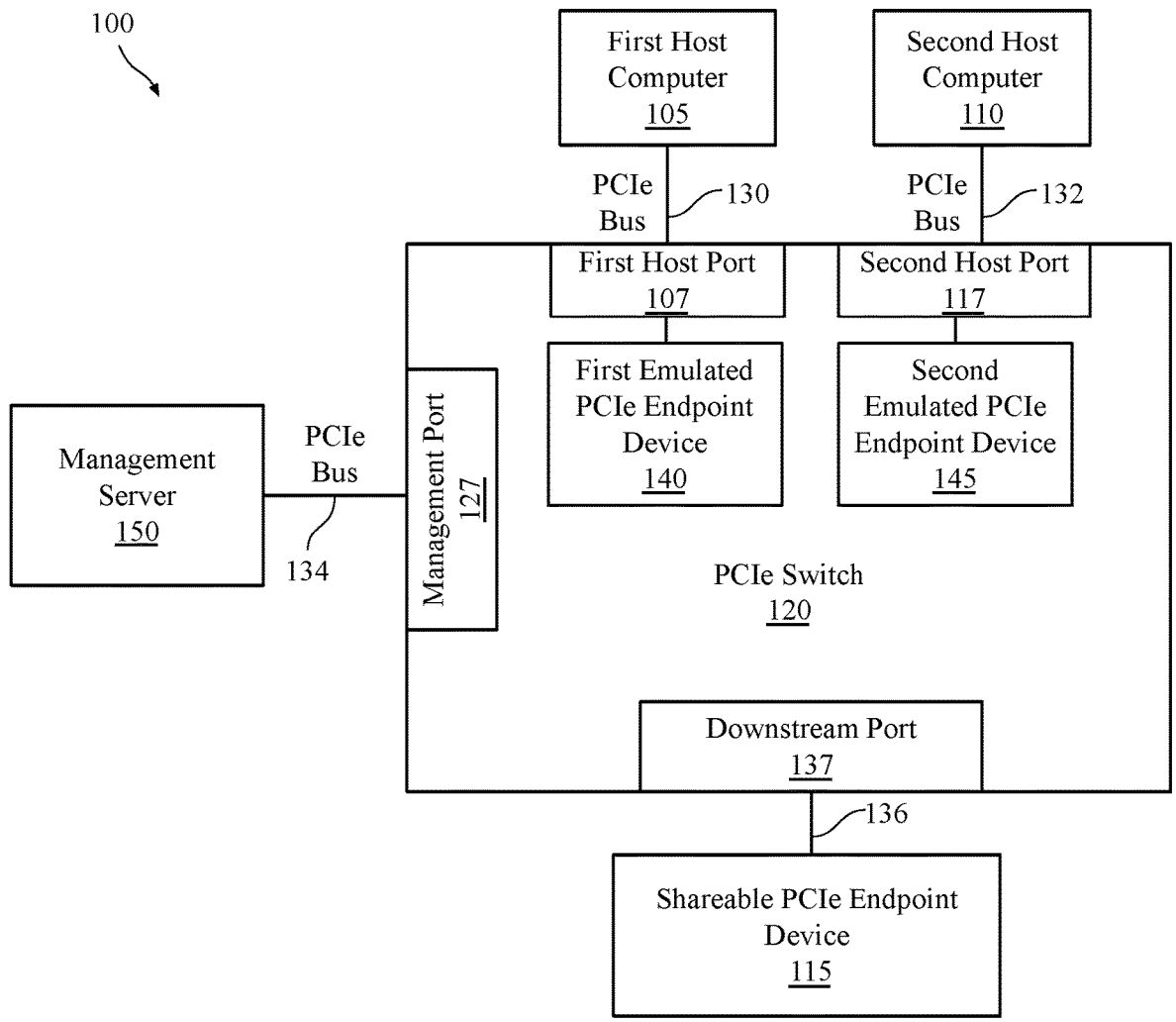
FIG. 1 is a block diagram illustrating a high-level view of the physical components of a system for accessing a shareable PCIe endpoint device over a PCIe switch, in accordance with an embodiment of the present invention.

FIG. 1 is a block diagram that shows a high-level view of the physical components present in a system 100 of the present invention in which multiple host computers, such as a first host computer 105 and a second host computer 110, desire access to a shareable PCIe endpoint device 115 through a PCIe switch 120. Persons of ordinary skill in the art will appreciate that the depiction of two host computers 105, 110 and the single shareable PCIe endpoint device 115 in FIG. 1 is for purposes of illustration only and that systems configured in accordance with the present invention may have more than two host computers and more than one shared PCIe endpoint device.

In the exemplary embodiment of FIG. 1, the first host computer 105 is coupled to the PCIe switch 120 through a first host port 107 of the PCIe switch 120 over a PCIe bus 130 and the second host computer 110 is coupled to the PCIe switch 120 through a second host port 117 of the PCIe switch 120 over a second PCIe bus 132. A management server 150 is coupled to the PCIe switch 120 through a management port 127 of the PCIe switch 120 over a third PCIe bus 134.

While the management server 150 is illustrated as being separate from the PCIe switch 120 in FIG. 1, this is not intended to be limiting and it is within the scope of the present invention to have the management server 150 implemented within the PCIe switch 120.

The shareable PCIe endpoint device 115 is coupled to the PCIe switch 120 through a downstream port 137 of the PCIe switch 120 over a PCIe bus 136. The shareable PCIe endpoint device 115 is considered to be "shareable" because the capabilities of the shareable PCIe endpoint device 115 can be accessed by both host computers 105, 110, each for a predetermined period of time, as determined and controlled by the management server 150. The time-based connections between each of the host computers 105, 110 and the shareable PCIe endpoint device 115 are implemented by the PCIe switch 120 under the control of the management server 150, as will be described herein.

It is contemplated that more than one shareable PCIe endpoint device can be included in the system 100, with the additional shareable PCIe endpoint devices represented by optional shareable PCIe endpoint devices coupled to the PCIe switch 120 through optional downstream ports in the PCIe switch 120. The description of the present invention will focus on one shareable PCIe endpoint device 115, but persons skilled in the art will appreciate that the description of the operation of the system 100 with reference to the shareable PCIe endpoint device 115 will apply equally to each such additional shareable PCIe endpoint device in the system 100.

According to an aspect of the present invention, a time-based scheduling of the shareable PCIe endpoint device 115 between the first host computer 105 and the second host computer 110 is implemented using the PCIe switch 120 and the shareable PCIe endpoint device 115 under the control of the management server 150. In particular, the management server 150 is operable to enumerate the devices connected to the PCIe switch 120 to identify each PCIe endpoint device coupled to the PCIe switch 120, such as the shareable PCIe endpoint device 115. The management server 150 is additionally operable to establish routing between the shareable PCIe endpoint device 115 and each of the host computers 105, 110 for specific periods of time. The management server 150 establishes routing between the shareable PCIe endpoint device 115 and each of the host computers 105, 110 using a respective emulated PCIe endpoint device 140, 145 which are configured by the PCIe switch 120, in combination with the management server 150, as will be described in detail herein.

Figure 2:
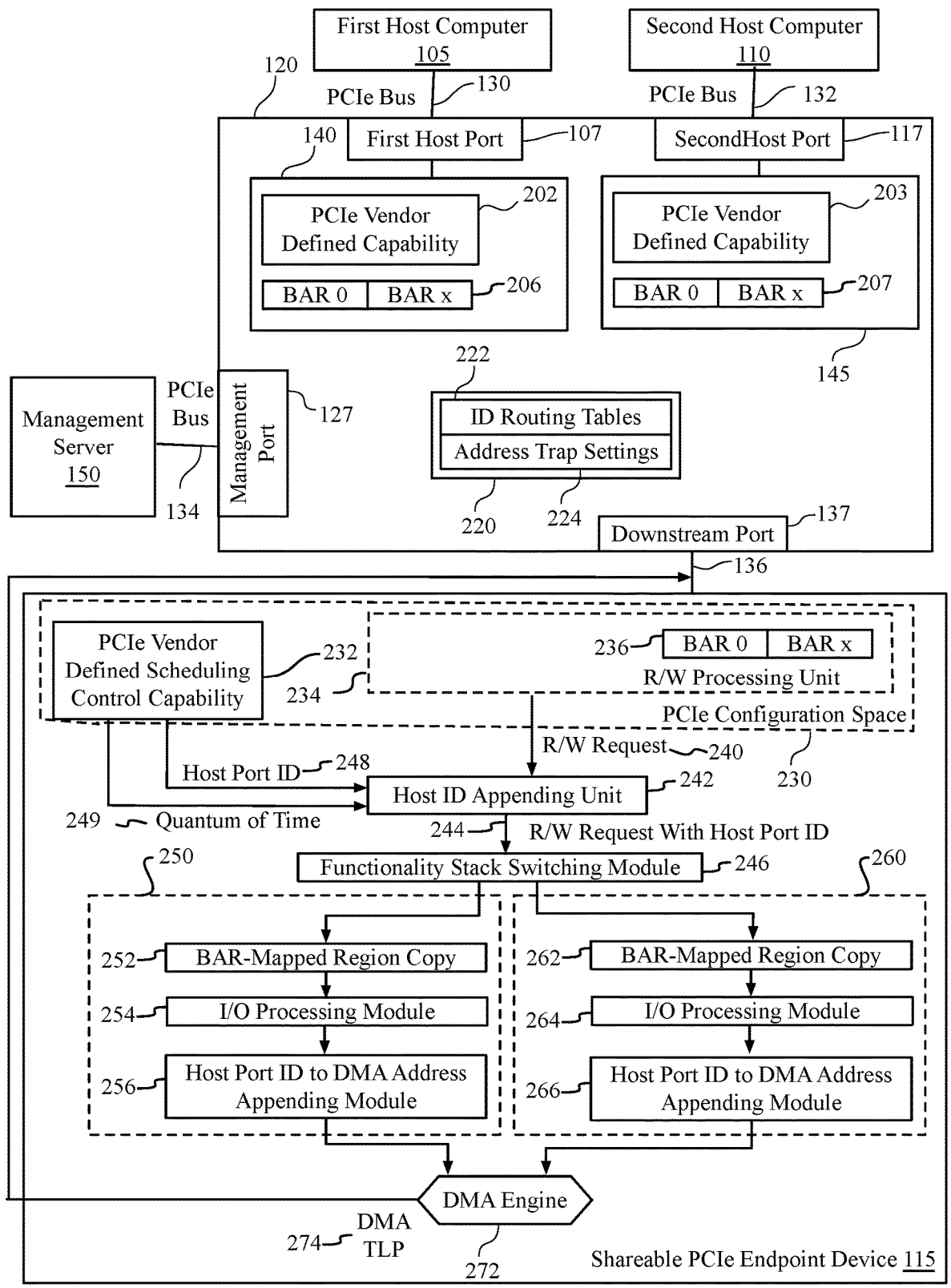
FIG. 2 is a block diagram illustrating a more detailed view of the physical components of a system for accessing a shareable PCIe endpoint device over a PCIe switch, in accordance with an embodiment of the present invention.

FIG. 2 shows a more detailed exemplary embodiment of the PCIe switch 120 and the shareable PCIe endpoint device 115. As illustrated, the PCIe switch 120 comprises the first emulated PCIe endpoint device 140 coupled to the first host computer 105 through a first host port 107 and the second emulated PCIe endpoint device 145 coupled to the second host computer 110 through a second host port 117. The emulated PCIe endpoint devices 140, 145 emulate the configuration and functions of the shareable PCIe endpoint device 115 to allow each of the host computers 105, 110 to access the capability of the shareable PCIe endpoint device 115 during a respective allocated quantum of time.

As is well known in the art, devices coupled to an upstream port of a PCIe switch, such as the host computers 105, 107 coupled to the respective host ports 107, 117 of the PCIe switch 120, perform enumeration to detect the respective emulated PCIe endpoint devices 140, 145 of the PCIe switch 120. After performing enumeration, a data routing relationship is established between the first host computer 105 and the PCIe endpoint devices on the downstream port(s) 137 of the PCIe switch 120 through the first emulated PCIe endpoint device 140 and a data routing relationship is established between the second host computer 110 and the PCIe endpoint devices on the downstream port(s) 137 of the PCIe switch 120 through the second emulated PCIe endpoint device 145. However, in the present invention, the PCIe switch 120 allows each of the host computers 105, 110 access to the shareable PCIe endpoint device 115 during a quantum of time, using the respective emulated PCIe endpoint devices 140, 145 established in the PCIe switch 120.

In the present invention, a scheduler running on the management server 150 can dynamically determine the quantum of time for which the shareable PCIe endpoint device 115 will be shared with each host computer 105, 110, based upon demand and workload assigned to the shareable PCIe endpoint device 115. If one of the host computers 105, 110 wants more access to the shareable PCIe endpoint device 115, compared to the other host computers 105, 110, the scheduler can grant a higher priority, and/or a larger quantum of time, to the shareable PCIe endpoint device 115 for that particular host computer. The criteria for allowing access to the shareable PCIe endpoint device 115 may be determined by various methods and is beyond the scope of the current disclosure. The scheduler running on the management server 150 may be implemented in software and/or hardware, or a combination thereof, as is known in the art.

To establish the emulated PCIe endpoint devices 140, 145 the management server 150 captures the configuration transaction layer packets (TLPs) transmitted during the enumeration process from the first host computer 105 over the first host port 107 and the configuration TLPs transmitted during the enumeration process from the second host computer 110 over the second host port 117. The management server 150 establishes the emulated PCIe endpoint devices 140, 145 by analyzing and responding to the configuration TLPs from the host computers 105, 110, respectively. The first emulated PCIe endpoint device 140 exposes the PCIe vendor defined capability 202 to the first host computer 105 and the second emulated PCIe endpoint device 145 exposes the PCIe vendor defined capability 203 to the second host computer 110. The PCIe vendor defined capability 202, 203 contains information that is required for controlling and accessing the respective emulated PCIe endpoint device 140, 145. This information includes interrupt vector numbers that are assigned to a start of the quantum of time and an end of the quantum of time. Each of the emulated PCIe endpoint devices 140, 145 comprises a base address register mapped (BAR-mapped) region 206, 207, respectively, including one or more base address registers (BAR) that are mapped to system memory. Each host computer 105, 110 waits for the start of the quantum of time generated by the respective emulated PCIe endpoint device 140, 145 prior to accessing the respective BAR-mapped regions 206, 207 of the emulated PCIe endpoint device 140, 145. Additionally, the PCIe switch 120 provides configurable routing circuitry 220, which includes ID routing tables 222 and address trap settings 224. The ID routing tables 222 and the address trap setting 224 are used for routing packets through the PCIe switch 120, as is commonly known in PCIe switching techniques.

As shown in FIG. 2, the shareable PCIe endpoint device 115 coupled to the downstream port 137 of the PCIe switch 120 includes a PCIe configuration space 230 having a read/write (R/W) processing unit 234 that includes a BAR-mapped region 236 comprising a plurality of BARs. The management server 150 performs enumeration to detect the shareable PCIe endpoint device 115 on the downstream port 137 of the PCIe switch 120. In response to the enumeration process, a PCIe vendor defined scheduling control capability 232 within the PCIe configuration space 230 is exposed to the management server 150. The PCIe vendor defined scheduling control capability 232 includes information that is required for controlling and accessing the shareable PCIe endpoint device 115. The information provided by the PCIe vendor defined scheduling control capability 232 includes interrupt vector numbers that are assigned to interrupts to control access by the host computers 105, 110 to the shareable PCIe endpoint device 115 during the quantum of time assigned to each of the host computers 105, 110. Exposing the PCIe vendor defined scheduling control capability 232 to the management server 150 allows the management server 150 to notify the shareable PCIe endpoint device 115 which host computer 105, 110 is going to be allowed to access the shareable PCIe endpoint device 115 for the allocated quantum of time. As such, only one host computer 105, 110 is allowed to access the shared PCIe endpoint device 115 by using the corresponding emulated PCIe endpoint device 140, 145 during a given quantum of time. The management server 150 may inform the first host computer 105 associated with the first host port 107 that it has been allocated a quantum of time using the PCIe vendor defined capability 202 of the first emulated PCIe endpoint device 140. Additionally, the management server 150 may inform the second host computer 110 associated with the second host port 117 that it has been allocated a next quantum of time using the PCIe vendor defined capability 203 of the second emulated PCIe endpoint device 145.

Following enumeration, and assuming that the quantum of time has been allocated to the first host computer 105, the first host computer 105 initializes the BAR-mapped region 206 of the first emulated PCIe endpoint device 140 and the management server 150, with the assistance of the configurable routing circuitry 220, establishes a connection relationship between the BAR-mapped region 206 of the first emulated PCIe endpoint device 140 and the BAR-mapped region 236 of the shareable PCIe endpoint device 115 coupled to the downstream port 137 of the PCIe switch 120. Alternatively, if the quantum of time has been allocated to the second host computer 110, the second host computer 110 initializes the BAR-mapped region 207 of the second emulated PCIe endpoint device 145 and the management server 150, with the assistance of the configurable routing circuitry 220, establishes a connection relationship between the BAR-mapped region 207 of the second emulated PCIe endpoint device 145 and the BAR-mapped region 236 of the shareable PCIe endpoint device 115.

The shareable PCIe endpoint device 115 includes a host ID appending unit 242, and a functionality stack switching module 246 that is coupled to select between two or more functionality stacks 250, 260, wherein each of the respective functionality stacks 250, 260 are associated with a respective one of the host computers 105, 110. The host ID appending unit 242 receives a read/write (R/W) request 240 from the R/W processing unit 234 and a host port identifier (ID) 248 from the PCIe vendor defined scheduling control capability 232. The host port ID 248 identifies the host port 107, 117 coupled to the host computer 105, 110 that has been allocated a quantum of time 249 by the management server 150. The host ID appending unit 242 appends the host port ID 248 to the R/W request 240 to generate a R/W request with host port ID 244 that is then provided to the functionality stack switching module 246. Each functionality stack 250, 260 is responsible for handling R/W requests originating at a respective one of the host computers 105, 110.

When a host computer 105, 110 requests access to the shareable PCIe endpoint device 115, the management server 150 responds by providing a quantum of time to the shareable PCIe endpoint device 115. The shareable PCIe endpoint device 115 sends a first interrupt to the management server 150 to indicate that the quantum of time has started and when the quantum of time has elapsed, the shareable PCIe endpoint device 115 sends a second interrupt to the management server 150 to indicate that the quantum of time has ended. The management server 150 is responsible for providing an interrupt to the appropriate host computer 105, 110 based upon the respective first and second interrupts received from the shareable PCIe endpoint device 115. If the quantum of time has been allocated to the first host computer 105, then during the duration of the quantum of time, the first host computer 105 may transmit memory TLPs that can be, for example, read requests or write requests, targeting the first emulated PCIe endpoint device 140, and the requests are then redirected to the shareable PCIe endpoint device 115 utilizing functionality of the PCIe switch 120 and the shareable PCIe endpoint device 115. Alternatively, if the quantum of time has been allocated to the second host computer 110, then during the duration of the quantum of time, the second host computer 110 may transmit memory TLPs that can be, for example, read requests or write requests, targeting the second emulated PCIe endpoint device 145, and the requests are then redirected to the shareable PCIe endpoint device 115 utilizing functionality of the PCIe switch 120 and the shareable PCIe endpoint device 115.

In a particular embodiment, assuming that the management server 150 has allocated a quantum of time to the first host computer 105, for the duration of the quantum of time, R/W requests originating from the first host computer 105 that are received at the first emulated PCIe endpoint device 140 are redirected to the BAR-mapped region 236 of the shareable PCIe endpoint device 115. In particular, the R/W request 240 will be received at the shareable PCIe endpoint device 115 and a R/W request with host ID 244 will be created within the shareable PCIe endpoint device 115. After the quantum of time has ended, the R/W requests originating at the first host computer 105 will no longer be redirected to the shareable PCIe endpoint device 115.

Whenever the shareable PCIe endpoint device 115 receives a redirected memory TLP targeting the BAR-mapped regions 206 of the emulated PCIe endpoint device 140, the R/W processing unit 234 converts the memory TLP into a R/W request 240 which contains both the address and the data field members of the TLP. The R/W request 240 is then forwarded to the host ID appending unit 242 which will append the host port ID 248 to the R/W request 240 to generate the R/W request with host port ID 244. The R/W request with host port ID 244 is then forwarded to the functionality stack switching module 246 which will direct the R/W request with host port ID 244 to the respective one of functionality stacks 250 260 that is responsible for handing that R/W requests from the respective host computer 105, 110 that has been allocated the quantum of time.

The R/W request with host port ID 244 will be received at the corresponding functionality stack 250, 260 and will be processed by one or more I/O processing modules 254, 264, the functionality of which are dependent upon the shareable PCIe endpoint device 115. Additionally, a host ID to DMA address appending module 256, 266 will prefix the host ID to each DMA address received from the corresponding host computer 105, 110. For example, in the case where a first functionality stack 250 is assigned to the first host computer 105, the R/W request with host ID 244 originating from the first host computer 105, which is a direct memory access (DMA) R/W request, will be directed to functionality stack 250 by functionality stack switching module 246, and host ID to DMA address appending module 256 will prefix the host ID to each DMA address received from the corresponding host computer 105.

The shareable PCIe endpoint device 115 uses the PCIe vendor defined scheduling control capability 232 and the management server 150 to switch the functionality stacks 250, 260 of the shareable PCIe endpoint device 115. As indicated above, the functionality stack switching module 246 selects the first functionality stack 250 that is associated with the first host computer 105 when the quantum of time is allocated to the first host computer 105 and selects the second functionality stack 260 that is associated with the second host computer 110 when the quantum of time is allocated to the second host computer 110. The functionality stack switching module 246 uses the host port ID 248 appended to the R/W requests by host ID appending unit 242 to identify which functionality stack should be selected by the functionality stack switching module 246.

As indicated above, each functionality stack 250, 260 of the shareable PCIe endpoint device 115 is responsible for handing requests coming from one of the host computers 105, 110. There is a one-to-one relationship between the host computers 105, 110 and the functionality stacks 250, 260 and as such, one functionality stack is assigned to each host computer that is sharing the resources of the shareable PCIe endpoint device 115. The functionality stacks 250, 260 are used to subdivide the processing power of the shareable PCIe endpoint device 115 to each host computer 105, 110. Each functionality stack 250, 260 is therefore responsible for handling R/W requests between the shareable PCIe endpoint device 115 and the respective host computer 105, 110. The processing power of the shareable PCIe endpoint device 115 may include multiple processing units, each of which can be assigned to one of the functionality stacks 250, 260.

Each functionality stack 250, 260 maintains a set of registers inside the shareable PCIe endpoint device 115 that will be copied from, or mapped with, the BAR-mapped region 236 of the shareable PCIe endpoint device 115, whenever the scheduler running within the management server 150 requests to switch functionality stacks. As shown in FIG. 2, each functionality stack 250, 260 includes a respective BAR-mapped region copy 252, 262. The BAR-mapped region copy 252, 262 is a memory region within the PCIe endpoint device 115 that enables switching between the functionality stacks 250, 260 depending upon which host computer 105, 110 has currently been allocated the quantum of time to access the shareable PCIe endpoint device 115. For example, if a previous quantum of time was assigned to the second host computer 110, when a first host computer 105 has been allocated the next quantum of time, the functionality stack will need to be switched from the second functionality stack 260 to the first functionality stack 250, thereby allowing the R/W requests to be directed to the first functionality stack 250 associated with the first host computer 105. To switch from the second functionality stack 260 to the first functionality stack 250, the BAR-mapped region copy 262 of second functionality stack 260 may be used to save a current state of the BAR-mapped region 236 of the shareable PCIe endpoint device 115. The BAR-mapped region 236 of the shareable PCIe endpoint device 115 may then be replaced with the BAR-mapped region copy 252 of the first functionality stack 250, thereby restoring the BAR-mapped region 236 of the shareable PCIe endpoint device 115 from the BAR-mapped region copy 252 associated with first the functionality stack 250 assigned to the first host computer 105. The shareable PCIe endpoint device 115 then uses the first functionality stack 250 for sending and receiving requests from the first host computer 105.

Each functionality stack 250, 260 includes one or more respective I/O processing modules 254, 264, the functionality of which are endpoint device specific, as is commonly known in the art. Each functionality stack 250, 260 additionally includes a respective host port ID to DMA address appending module 256, 266. The host port ID to DMA address appending module 256, 266 is preferably implemented in firmware running on the shareable PCIe endpoint device 115 to prefix the host port ID 107, 117 of the respective host computer 105, 110 that is currently accessing the shareable PCIe endpoint device 115 to each DMA address received from the respective host computer 105, 110 before being passed to the DMA engine 272 of the shareable PCIe endpoint device 115. The management server 150 provides the host port ID 248 to the shareable PCIe endpoint device 115 for appending to the DMA addresses received from the respective host computer 105, 110 and provides the respective quantum of time 249 to the shareable PCIe endpoint device 115 for generating a signal indicating the start of the quantum of time and a signal indicating the end of the quantum of time to the management server 150. In response to the signal indicating the start of the quantum of time, management server 150 generates a first interrupt and transmits the generated first interrupt to the respective host computer 105, 110. In response to the signal indicating the end of the quantum of time, management server 150 generates a second interrupt and transmits the generated second interrupt to the respective host computer 105, 110.

Some of the requests originating at the host computer 105 may require a response from the shareable PCIe endpoint device 115. Depending upon the particular request that originated from the first host computer 105, the response from the shareable PCIe endpoint device may require a DMA and, as such, the shareable PCIe endpoint device 115 may need to respond by reading or writing to the memory of the first host computer 105. The memory read or write TLPs that originate at the shareable PCIe endpoint device 115 and are directed toward the host computer 105 are considered to be DMA requests. The DMA TLPs 274 originating at the shareable PCIe endpoint device 115 can be directed to the first host computer 105 through the first emulated PCIe endpoint device 140 at any point in time by using the address trap settings 224 and ID routing tables 222 implemented in the PCIe switch 120. The DMA TLPs 274 originating at the shareable PCIe endpoint device 115 can be directed to the first host computer 105, regardless of whether or not the first host computer 105 is currently being allocated a quantum of time.

Accordingly, in accordance with the present invention, the host computers 105, 110 are only allowed access to the BAR-mapped regions of their respective emulated PCIe endpoint device 140, 145 during the respective quantum of time assigned to the host computer 105, 110. However, any requests originating at the shareable PCIe endpoint device 115 in response to the requests from the host computer 105, 110 can be directed to the respective host computer 105, 110 even after the quantum of time has ended. As such, even though the shareable PCIe endpoint device 115 may be actively receiving requests from the second host computer 110 during a next quantum of time, responses originating at the shareable PCIe endpoint device 115 in response to requests received from the first host computer 105 during a previous quantum of time can still be directed to the first host computer 110.

In general, while there are quantum of time restrictions on when the host computers 105, 110 can access the respective emulated PCIe endpoint devices 140, 145, there are no quantum of time restrictions on when the PCIe endpoint device 115 can access the emulated PCIe endpoint devices 140, 145 to transmit DMA TLPs in response to previous requests from the host computers 105, 110.

DMA TLPs 274 generated by the DMA engine 272 of the shareable PCIe endpoint device 115 in response to the R/W request 240 from the respective host computer 105, 110 are transmitted over the PCIe bus 136 to the respective host computer 105, 110 using the address trap settings 224 and ID routing tables 222 of the PCIe switch 120. In particular, the host port ID to DMA address appending module 256 of the first functionality stack 250 associated with the first host computer 105 is responsible for appending the host port ID 248 along with the most significant unused bytes of the DMA addresses of the host computer 105, in such a way that the resulting DMA address will be present in the remaining LSB bits of the modified DMA addresses. For example, if the 64-bit DMA address originating from the first host computer 105 is 0x0000XXXXXXXXXXXX and the first most significant unused byte of this 64-bit DMA address is used for appending the host port ID, which is 0xAA, then the resulting DMA address will be 0xAA00XXXXXXXXXXXX. When the DMA TLPs 274 originating from the shareable PCIe endpoint device 115 arrive at the downstream port 137 of the PCIe switch 120, the PCIe switch 120 will examine the MSB bits of each DMA address and extract the host port ID 248 to direct the TLPs to the host computer 105.

Additionally, as is well known in the art, the ID routing tables 222 of the configurable routing circuitry 220 of the PCIe switch 120 are initialized to map the PCIe bus:device:function numbers of the emulated PCIe endpoint device 140 to the PCIe bus:device:function numbers of the shareable PCIe endpoint device 115. The ID routing tables 222, along with a host port ID, are used to route the DMA TLPs 274 targeting the memory mapped to the BAR-mapped region 236 of the shareable PCIe endpoint device 115 to the host computer 105.

As previously described, the management server 150, with the assistance of the configurable routing circuitry 220, establishes a connection relationship between the respective emulated PCIe endpoint device 140, 145 and the shareable PCIe endpoint device 115 that is being shared between multiple host computer 105, 110, during each allocated quantum of time. The connection relationship enables the read and write requests targeting the BAR-mapped regions of the respective emulated PCIe endpoint device 140, 145 to be redirected to the BAR-mapped regions of the shareable PCIE endpoint device 115. By establishing this connection relationship, when the PCIe switch 120 receives memory TLPs from the host computer 105 that are targeting the BAR-mapped region 206, 207 of a respective one of the emulated PCIe endpoint devices 140, 145, the memory TLPs will be redirected to BAR-mapped region 236 of the shareable PCIe endpoint device 115.

Figure 3A:
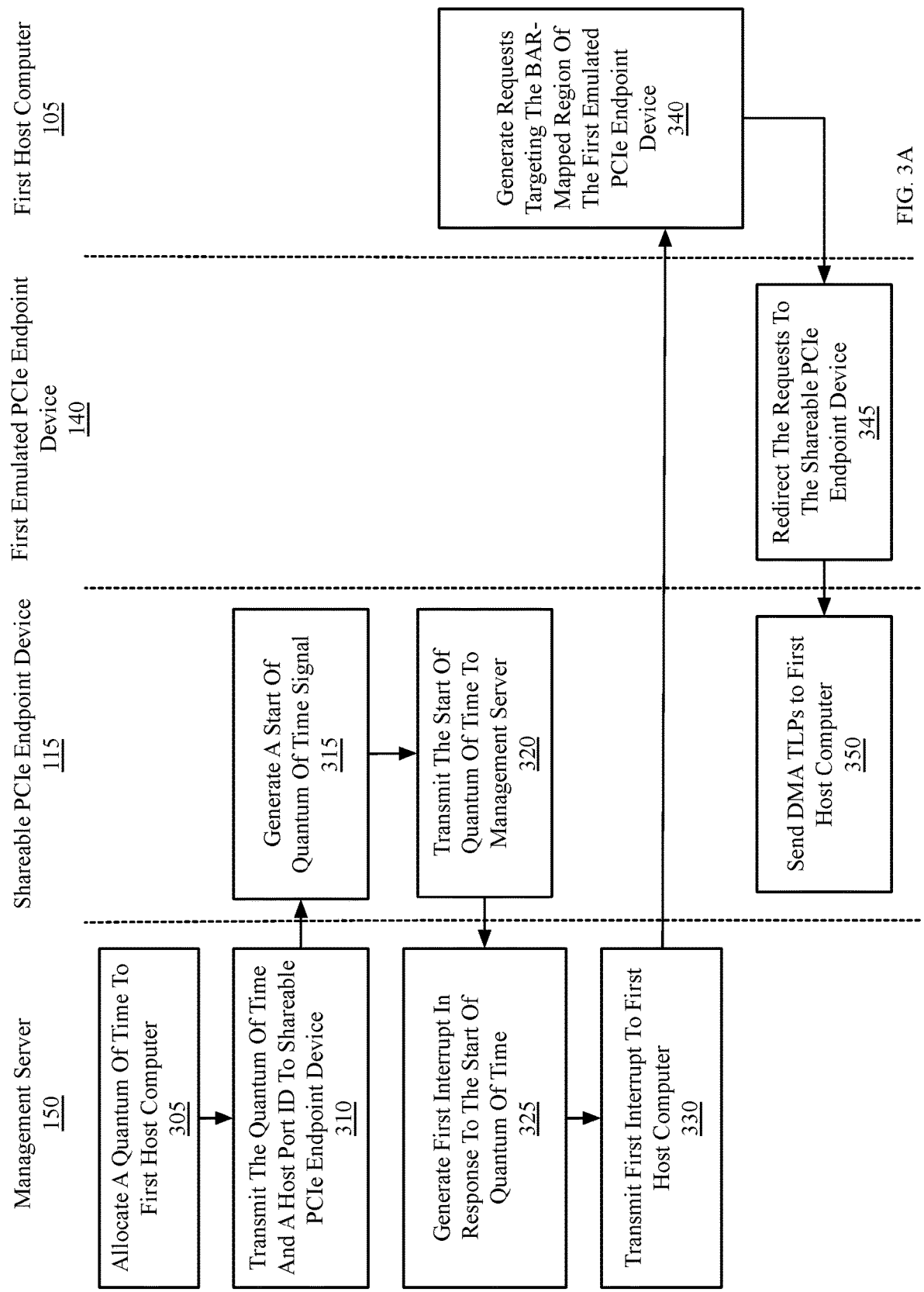
FIGS. 3A-3B is a are swim-diagrams illustrating a process for accessing a shareable PCIe endpoint device over a PCIe switch, in accordance with an embodiment of the present invention.
Figure 3B:
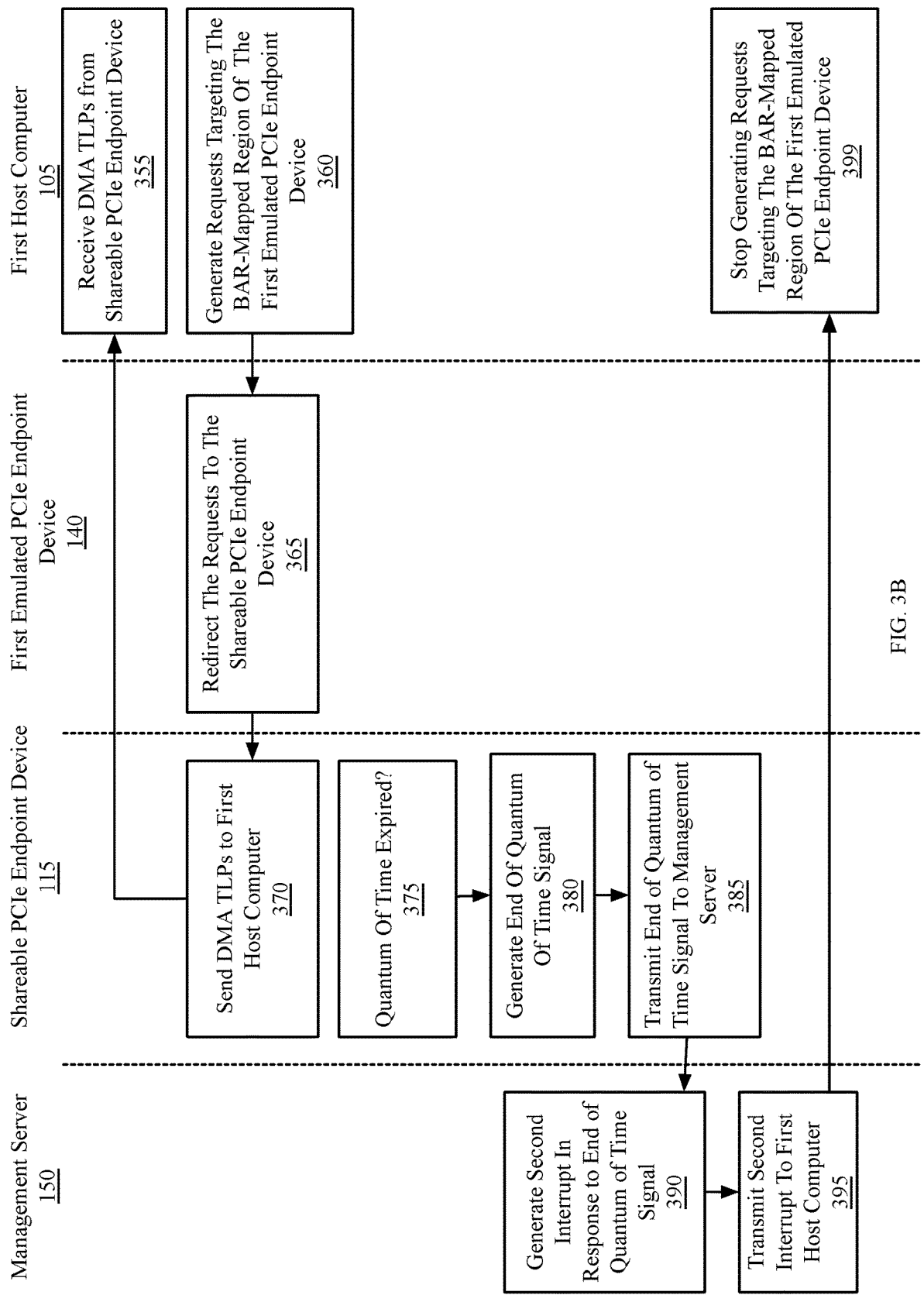

The swim-diagrams of FIG. 3A and FIG. 3B, in combination, illustrate an exemplary process for accessing the shareable PCIe endpoint device 115, in accordance with an embodiment of the present invention. For example, the process can be used by a user and implemented in part by the management server 150 and the PCIe switch 120 to allow access to the shareable PCIe endpoint 115 by the host computer 105 for a specified quantum of time that is allocated to the host computer 105. FIG. 3A and FIG. 3B illustrate lanes for steps that can be performed by the management server 150, the shareable PCIe endpoint device 115, the emulated PCIe endpoint device 140 and the host computer 105. In the illustrated swim-diagrams of FIG. 3A and FIG. 3B, it is assumed that enumeration and initiation have already been performed by the management server 150 and the host computer 105. As such, as previously described, the emulated PCIe endpoint device 140 has been established in the PCIe switch 120 and the communication relationship between the emulated PCIe endpoint device 140 and the shareable PCIe endpoint device 115 has been previously established.

With reference to FIG. 3A, the host computer 105 cannot directly transmit requests to the management server 150 for granting access to the shareable PCIe endpoint device 115 because the host computer 105 is acting as a slave device and will only be accessing the BAR-mapped regions 236 of the shareable PCIe endpoint device 115 during the quantum of time allocated by the management server 150. As such, a scheduler running on the management server 150 identifies and allocates the quantum of time to the host computer 105 (305). The management server 150 then transmits the quantum of time and a host port ID associated with the host computer 105 to the shareable PCIe endpoint device 115 (310). More specifically, the scheduler running on the management server 150 uses the PCIe vendor defined scheduling control capability 232 of the shareable PCIe endpoint device 115 to schedule the shareable PCIe device 115 to the host computer 105. The scheduler writes the host port ID of the host port 107 of the PCIe switch 120 to which the corresponding host computer 105 is coupled, and the allocated quantum of time for which the host computer 105 is allowed to access the shareable PCIe endpoint device 115, to the PCIe vendor defined scheduling control capability 232, at the beginning of each allocation of quantum of time.

After receiving the quantum of time and host port ID from the management server 150, and when the shareable PCIe endpoint device 115 is ready to process requests from the first host computer 105, such as switching to the functionality stack associated with the first host computer 105, the shareable PCIe endpoint device 115 generates a start of the quantum of time signal (315). The start of the quantum of time signal is transmitted over the PCIe bus 136 and the management port 127 to the management server 150 (320). The management server 150 then generates a first interrupt in response to receiving the start of the quantum of time (325) and the management server 150 transmits the first interrupt to the host computer 105 over the host port 107 (330) to notify the first host computer 105 that the duration of the quantum of time allocated to the first host computer 105 has started. The first host computer 105 acknowledges the first interrupt from the management server 150 and begins generating requests targeting the BAR-mapped region 206 of the first emulated PCIe endpoint device 140 (340). The requests targeting the BAR-mapped region 206 of the first emulated PCIe endpoint device 140 are then redirected to the BAR-mapped region 236 of the shareable PCIe endpoint device 115 (345). The shareable PCIe endpoint device 115 may respond by sending DMA TLPs to the first host computer 105 (350).

With reference now to FIG. 3B, DMA TLPs transmitted from the shareable PCIe endpoint device 140 (350 of FIG. 3A) are received at the host computer 105 (355). During the quantum of time allocated to the first host computer 105, the first host computer 105 continues to transmit requests to the emulated PCIe endpoint device 140 (360), that are subsequently redirected to the shareable PCIe endpoint device 115 (365). The shareable PCIe endpoint device 115 continues to respond by sending DMA TLPs to the first host computer 105 (370). Simultaneously, the shareable PCIe endpoint device 115 tracks the quantum of time, and when the quantum of time has expired (375), the shareable PCIe endpoint device generates an end of quantum of time signal (380) and transmits the end of quantum of time signal to the management server 150 (385). The management server 150 generates a second interrupt in response to receiving the end of quantum of time signal from the shareable PCIe endpoint device 115 (390) and then transmits the second interrupt to the host computer 105 (395). In response to the second interrupt, the host computer 105 stops generating requests targeting the BAR-mapped region of the first emulated PCIe endpoint device 140 (399). As such, the first host computer 105 stops accessing the BAR-mapped regions of the emulated PCIe endpoint device 140 until it receives a next interrupt from management server 150 indicating the start of a next quantum of time allocated to the first host computer 105.

While FIG. 3A and FIG. 3B illustrate an exemplary process for a connection between the first host computer 105 and the shareable PCIe endpoint device 115 for a quantum of time allocated to the host computer 105, it is contemplated that the process may continue by next selecting a different host computer to be connected to the shareable PCIe endpoint device 115 through a different emulated PCIe endpoint device. In general, each host computer that is accessing the shareable PCIe endpoint device 115 will be allocated a quantum of time by the scheduler running on the management server 150 during which the host computer can access the shareable PCIe endpoint device 115.

Figure 4:
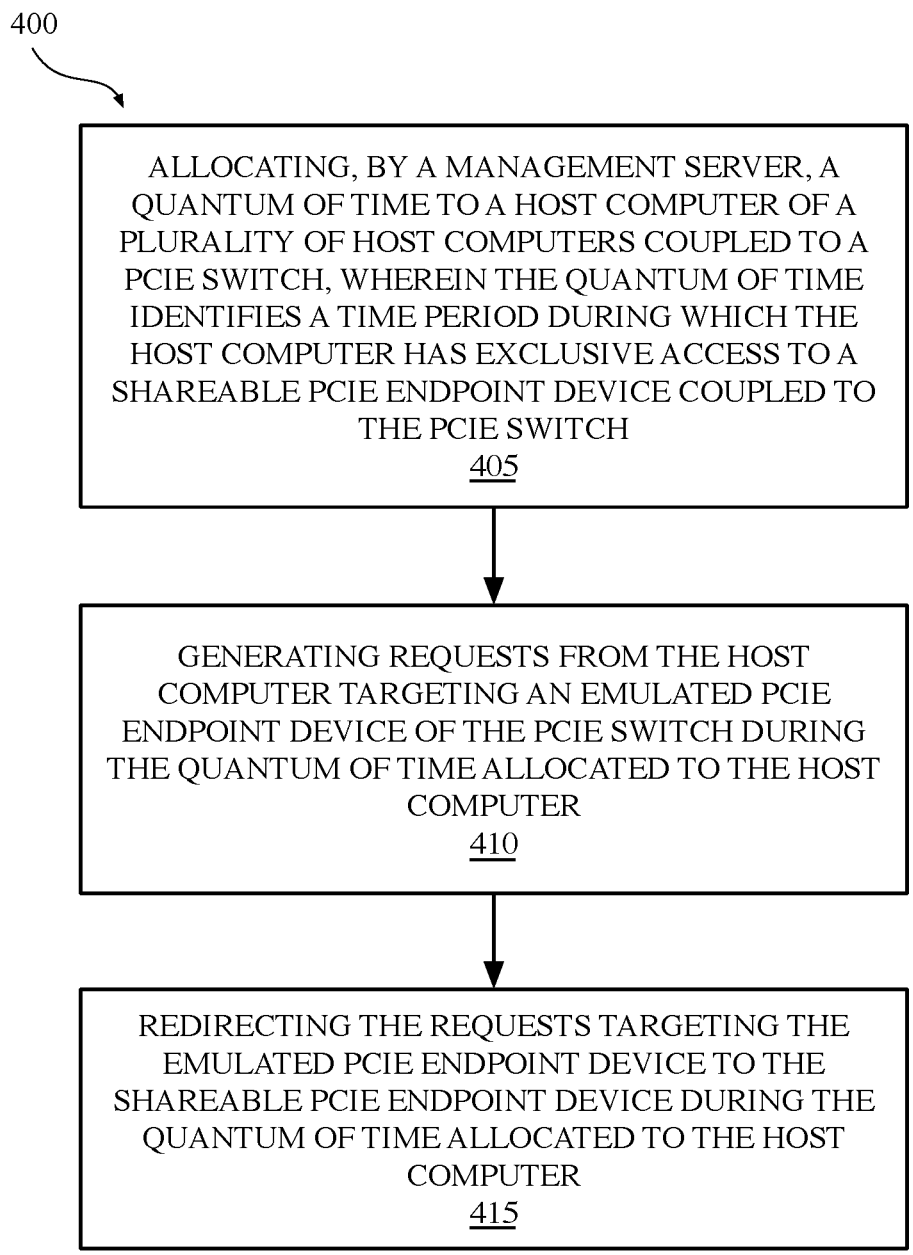
FIG. 4 is a flow diagram illustrating a high-level method for allowing multiple host computers exclusive access to a shareable PCIe endpoint device during a specific quantum of time, in accordance with an embodiment of the present invention.

FIG. 4 illustrates a flow diagram of a method 400 for time-based scheduling of a shareable PCIe endpoint device through a PCIe switch.

At operation 405, the method includes, allocating, by a management server, a quantum of time to a host computer of a plurality of host computers coupled to a PCIe switch, wherein the quantum of time identifies a time period during which the host computer has exclusive access to a shareable PCIe endpoint device coupled to the PCIe switch. With reference to FIG. 1, in the present invention, the management server 150 allocates a quantum of time to the first host computer 105 coupled to the PCIe switch 120 and allocates a separate quantum of time to the second host computer 110 coupled to the PCIe switch 120.

At operation 410, the method includes, generating requests from the host computer targeting an emulated PCIe endpoint device of the PCIe switch during the quantum of time allocated to the host computer. With reference to FIG. 1, requests are generated at the first host computer 105 targeting the first emulated PCIe endpoint device 140 of the PCIe switch 120 during the quantum of time allocated to the first host computer 105. Similarly, requests are generated at the second host computer 110 targeting the emulated PCIe endpoint device 145 of the PCIe switch 120 during a quantum of time allocated to the second host computer 110.

At operation 415, the method includes, redirecting the requests from the emulated PCIe endpoint device to the shareable PCIe endpoint device during the quantum of time allocated to the host computer. With reference to FIG. 1, requests from the first host computer 105, targeting the first emulated PCIe endpoint device 140, are redirected to the shareable PCIe endpoint device 115 using the address trap settings 224 and ID routing tables 222 of the PCIe switch 120 during the quantum of time allocated to the first host computer 105. Similarly, requests from the second host computer 110, targeting the second emulated PCIe endpoint device 145, are redirected to the shareable PCIe endpoint device 115 using the address trap settings 224 and ID routing tables 222 of the PCIe switch 120 during the separate quantum of time allocated to the second host computer 110.

Figure 6:
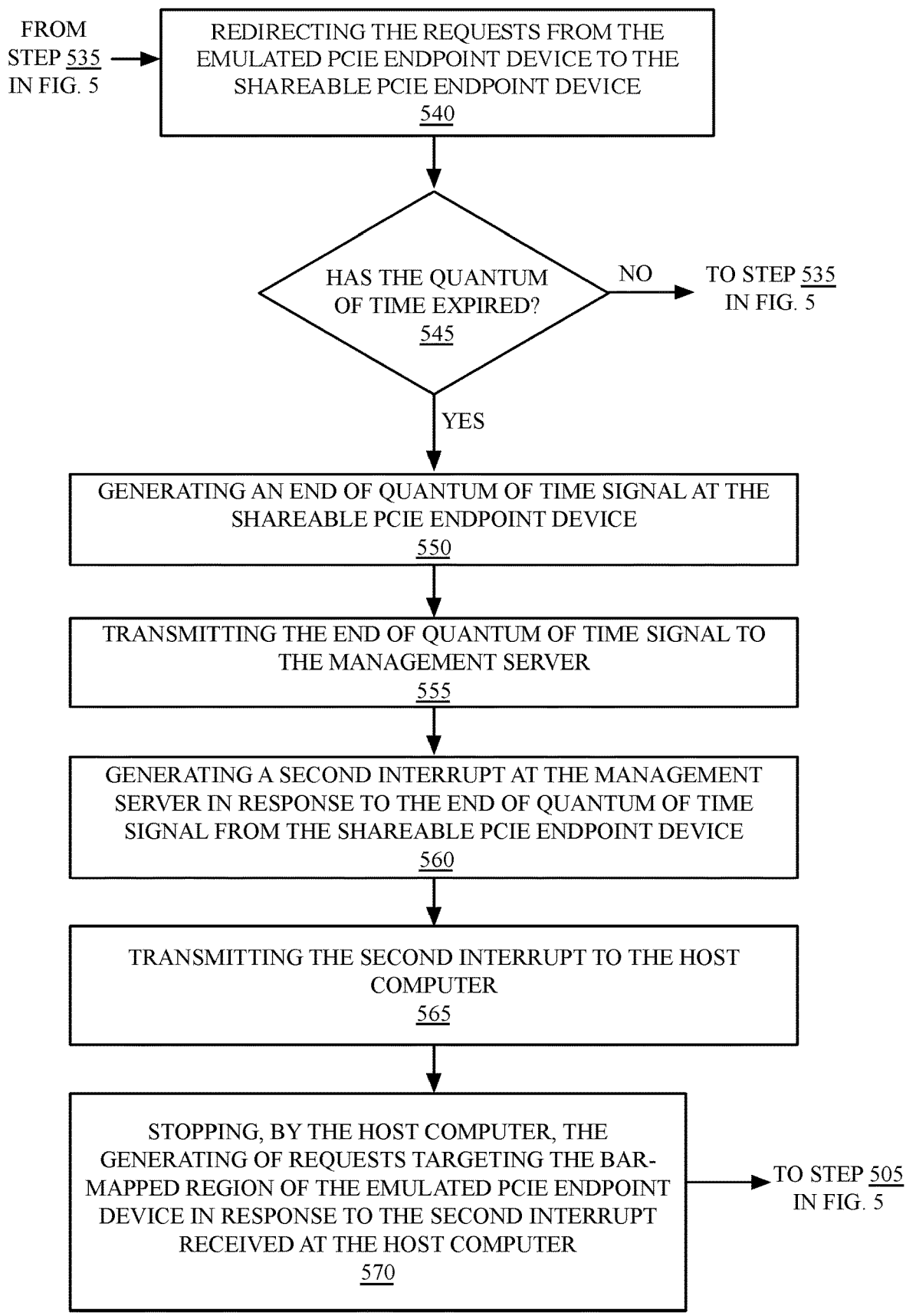
FIG. 6 is a flow diagram illustrating a second portion of the detailed method for allowing multiple host computers exclusive access to a shareable PCIe endpoint device during a specific quantum of time, in accordance with an embodiment of the present invention.

FIG. 5 and FIG. 6, in combination, illustrate a more detailed flow diagram of a method 500 for time-based scheduling of a shareable PCIe endpoint device through a PCIe switch.

At operation 505 of FIG. 5, the method includes, selecting, by a management server associated with the PCIe switch, a host computer of the plurality of host computers and a quantum of time to be allocated to the selected host computer. With reference to FIG. 2, the management server 150 associated with the PCIe switch 120 may select the first host computer 105 of a plurality of host computers 105, 110 coupled to respective host ports 107, 117 of the PCIe switch 120 and the management server 150 may selected a quantum of time to be allocated to the selected first host computer 105. Similarly, the management server 150 may select the second host computer 110 of the plurality of host computers 105, 110 coupled to respective host ports 107, 117 of the PCIe switch 120 and the management server 150 may select a separate and distinct quantum of time to be allocated to the selected second host computer 110. In a particular embodiment, a scheduler of the management server 150 may be used to select the respective host computer and the corresponding quantum of time. As previously described, in general the quantum of time for which the shareable PCIe endpoint device 115 will be shared with each respective host computer 105, 110 may be based upon demand and workload assigned to the shareable PCIe endpoint device 115. The criteria for selecting the respective quanta of time may be determined by various methods known to those skilled in the art.

At operation 510, the method includes, transmitting a host port ID associated with the selected host computer and the respective quantum of time to be allocated to the selected host computer to the shareable PCIe endpoint device. With reference to FIG. 2, if the first host computer 105 is currently selected, the host port ID of first host port 107 associated with the first host computer 105 and the quantum of time to be allocated to the first host computer 105 are transmitted to the shareable PCIe endpoint device 115 utilizing the functionality provided by the PCIe vendor defined scheduling control capability 232.

At operation 515, the method includes, generating a start of quantum of time signal at the shareable PCIe endpoint device and at operation 520, the method continues by transmitting the start of quantum of time signal from the shareable PCIe endpoint device to the management server. With reference to FIG. 2, the shareable PCIe endpoint device 115 utilizes the quantum of time 249 and the host port ID 248 to generate a start of quantum of time signal that indicates the start of the quantum of time period that the first host computer 105 coupled to the host port indicated by the host port ID 248 will be allowed access to the shareable PCIe endpoint device 115. In a particular embodiment, the shareable PCIe endpoint device 115 delays transmitting the start of quantum of time interrupt to the management server 150 until it is ready to receive requests from the first host computer 105, which may require switching the functionality stack, as described in additional detail with reference to FIG. 8.

At operation 525, the method includes, generating a first interrupt at the management server in response to receiving the start of quantum of time signal from the shareable PCIe endpoint device. With reference to FIG. 2, and as previously described, the management server 150 receives the start of quantum of time signal from the shareable PCIe endpoint device 115 and generates a first interrupt in response to the start of quantum of time signal.

At operation 530, the method includes, transmitting the first interrupt through the emulated PCIe endpoint device to the host computer. With reference to FIG. 2, the first interrupt generated by the management server 150 is transmitted through the first emulated PCIe endpoint device 140 to the first host computer 105 over the first host port 107 or through the second emulated PCIe endpoint device 145 to the second host computer 110 over the second host port 117, depending upon which host computer 105, 110 has currently been allocated the quantum of time.

At operation 535, the method includes generating requests, at the host computer, targeting the BAR-mapped region of the emulated PCIe endpoint device in response to the first interrupt. With reference to FIG. 2, the first host computer 105 generates requests targeting the BAR-mapped region 206 of the first emulated PCIe endpoint device 140 or the second host computer 110 generates request targeting the BAR-mapped region 207 of the second emulated PCIe endpoint device 145, depending upon which host computer 105, 110 has currently been allocated the quantum of time.

At operation 540 of FIG. 6, the method includes, redirecting the requests from the emulated PCIe endpoint device to the shareable PCIe endpoint device. With reference to FIG. 2, the requests provided to the emulated PCIe endpoint device 140 by the first host computer 105 are redirected to the shareable PCIe endpoint device 115 by mapping the BAR-mapped regions 206 of the first emulated PCIe endpoint device 140 to the BAR-mapped region 236 of the shareable PCIe endpoint device 115, using the address trap settings 224 and the ID routing tables 222 of the PCIe switch 120. Alternatively, the requests provided to the emulated PCIe endpoint device 145 by the second host computer 110 are redirected to the shareable PCIe endpoint device 115 by mapping the BAR-mapped regions 207 of the second emulated PCIe endpoint device 145 to the BAR-mapped region 236 of the shareable PCIe endpoint device 115, using the address trap settings 224 and the ID routing tables 222 of the PCIe switch 120.

At operation 545, the method includes, determining whether or not the quantum of time has expired. With reference to FIG. 2, the shareable PCIe endpoint device 115 determines when the quantum of time 249 has expired. If the quantum of time has not expired, the method returns back to step 535 and the host computer 105 continues to transmit requests to the emulated PCIe endpoint device 140. Alternatively, if the quantum of time has expired, the method continues to step 550, wherein the method includes, generating an end of quantum of time signal at the shareable PCIe endpoint device 115.

At operation 555, the method includes, transmitting the end of quantum of time signal to the management server and at operation 560, the method continues by generating a second interrupt at the management server in response to receiving the end of quantum of time signal from the shareable PCIe endpoint device. At operation 565, the management server 150 transmits the second interrupt to the host computer. With reference to FIG. 2, the shareable PCIe endpoint device 115 transmits the end of quantum of time signal to the management server 150 when the quantum of time has expired. The management server 150 then generates a second interrupt and transmits the second interrupt to the first host computer 105 through the emulated PCIe endpoint device 140 over the first host port 107 or to the second host computer 110 through the second emulated PCIe endpoint device 145, over the second host port 117 depending upon which host computer 105, 110 has currently been allocated the quantum of time.

At operation 565, the method includes, stopping, by the host computer, the transmitting of requests targeting the BAR-mapped region of the emulated PCIe endpoint device from the host computer in response to the second interrupt received at the host computer. With reference to FIG. 2, when the host computer 105 receives the second interrupt from the management server 150, it stops transmitting requests targeting the BAR-mapped region of the emulated PCIe endpoint device 140 until another start of quantum of time interrupt is received.

Figure 7:
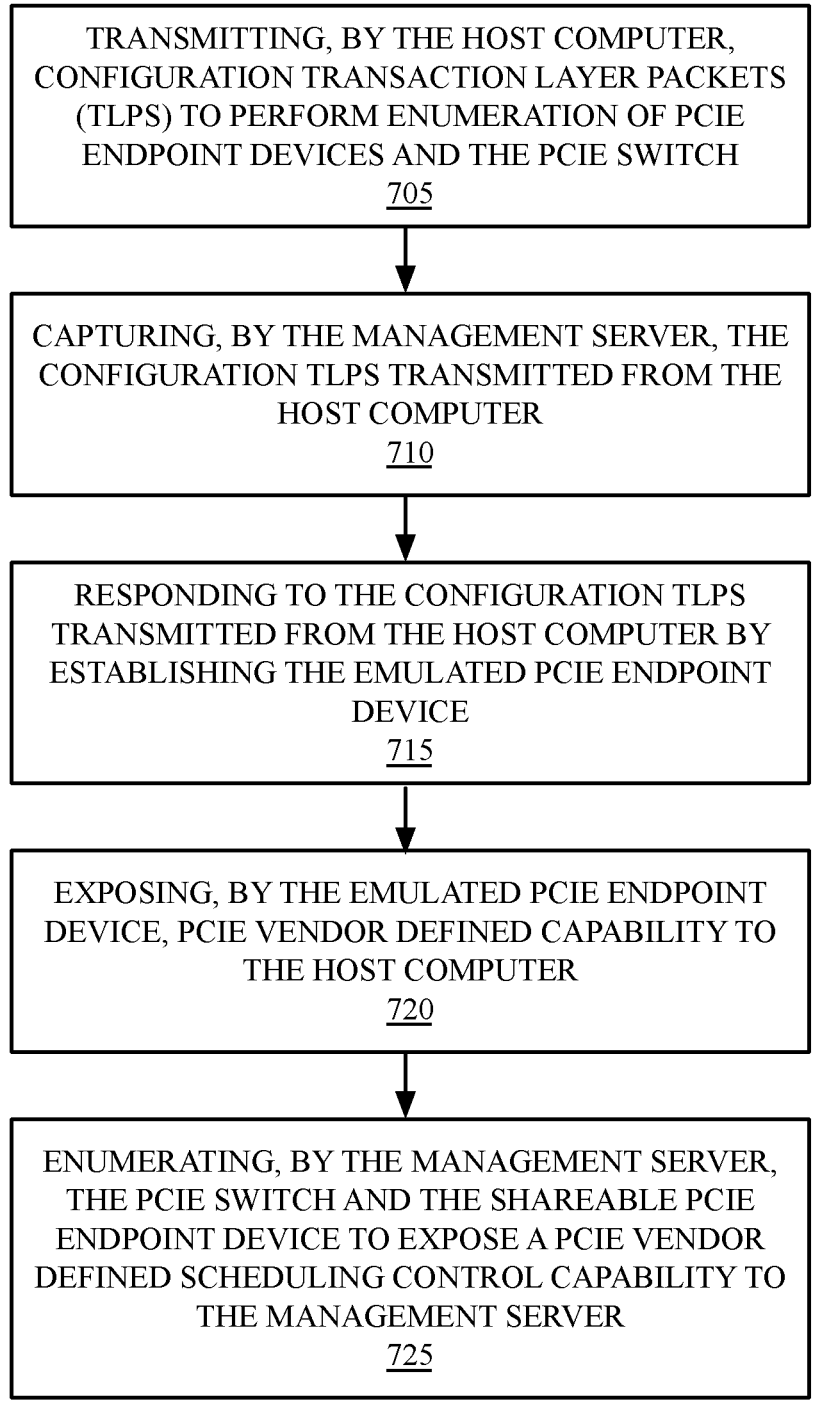
FIG. 7 is a flow diagram illustrating a method for establishing an emulated PCIe endpoint device, in accordance with an embodiment of the present invention.

FIG. 7 is a flow diagram 700 illustrating in detail the enumeration process that is performed at start-up of the host computer and by the management server, prior to the allocation of the quantum of time to the host computer.

At operation 705, the method includes, transmitting, by the host computer, configuration transaction layer packets (TLPs) to perform enumeration of PCIe endpoint devices and the PCIe switch. The method continues at operation 710 by capturing, by the management server, the configuration TLPs transmitted from the host computer. By capturing and respond to the configuration TLPs received from the host computers, the management server will create the emulated PCIe endpoints associated with each of the respective host computers. As such, the management server will configure the responses to the configuration TLPs in such a way that the host computer will think a PCIe endpoint device is present on the PCIe bus. With reference to FIG. 2, the configuration TLPs are transmitted by the first host computer 105 over the first host port 107 and captured by the management server 150. Alternatively, configuration TLPs are transmitted by the second host computer 110 over the second host port 117 and captured by the management server 150. It is noted that the configuration TLPs may be transmitted by the first host computer 105 and the second host computer 110 at any time, regardless of whether or not the specific host computer has been allocated a quantum of time.

At operation 710, the method includes, responding to the configuration TLPs transmitted from the host computer by establishing the emulated PCIe endpoint device. With reference to FIG. 2, the management server 150 responds to the configuration TLPs transmitted by the first host computer 105 by establishing the emulated PCIe endpoint device 140 at the PCIe switch 120 and responds to the configuration TLPs transmitted by the second host computer 110 by establishing the emulated PCIe endpoint device 145 at the PCIe switch 120.

At operation 720, the method includes, exposing by the management server, an emulated PCIe endpoint device, which has PCIe vendor defined capability, to the host computer. With reference to FIG. 2, the emulated PCIe endpoint device 140 exposes the PCIe vendor defined capability 202 to the first host computer 105. As previously described, the PCIe vendor defined capability 202 contains information that is required for controlling and accessing the emulated PCIe endpoint device 140. Similarly, the emulated PCIe endpoint device 145 exposes the PCIe vendor defined capability 203 to the second host computer 110.

At operation 725, the method includes, enumerating, by the management server, the PCIe switch and the shareable PCIe endpoint device to expose a PCIe vendor defined scheduling control capability to the management server. With reference to FIG. 2, the management server 150 performs enumeration to expose the PCIe vendor defined scheduling control capability 232 to the management server 150. As previously described, the PCIe vendor defined scheduling control capability 232 includes information that is required for controlling and accessing the shareable PCIe endpoint device 115.

Figure 8:
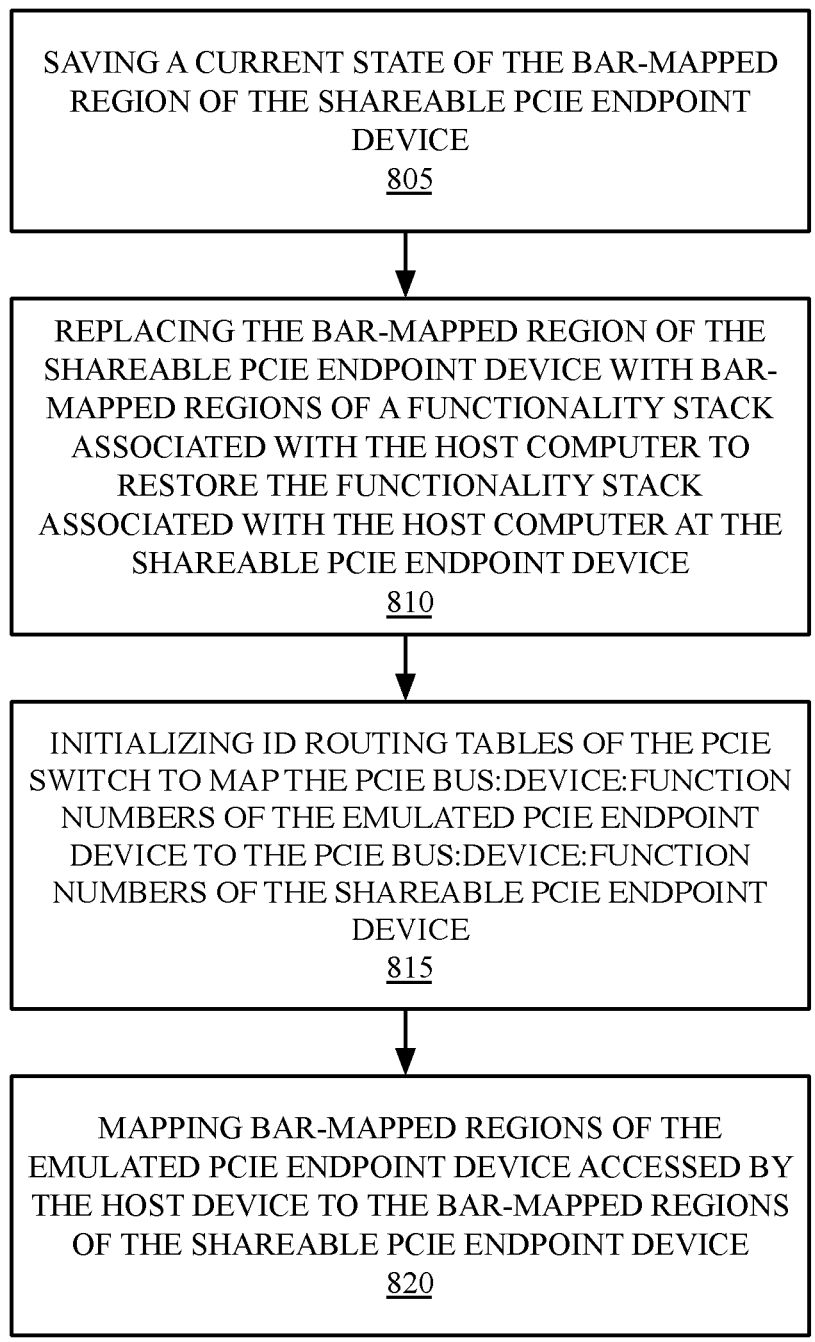
FIG. 8 is a flow diagram illustrating establishing a communication relationship between the emulated PCIe endpoint device and the shareable PCIe endpoint device, in accordance with an embodiment of the present invention.

FIG. 8 is a flow diagram 800 illustrating operations for switching the functionality stack at the shareable PCIe endpoint device, prior to redirecting the requests from the emulated PCIe endpoint device to the shareable PCIe endpoint device during the quantum of time allocated to the host computer. The functionality stacks are switched based upon which of the host computers 105, 110 has been allocated the quantum of time. As shown in FIG. 2, the first host computer 105 is associated with the first functionality stack 250 and the second host computer 110 is associated with the second functionality stack 260. In operation, if the first host computer 105 has been allocated a current quantum of time, and the previous quantum of time was allocated to the second host computer 110 associated with the second functionality stack 260, then the shareable PCIe endpoint device 115 switches the functionality stack from the second functionality stack 260 to the first functionality stack 250.

At operation 805, the method includes, saving a current state of the BAR-mapped regions of the shareable PCIe endpoint device. With reference to FIG. 2, assuming that first host computer 105 has been allocated the quantum of time and that the first host computer 105 is associated with first functionality stack 250, a current state of the BAR-mapped region 236 of the shareable PCIe endpoint device 115 may be saved to BAR-mapped region copy 262 of second functionality stack 260 of the shareable PCIe endpoint device 115.

At operation 810, the method includes, replacing the BAR-mapped regions of the shareable PCIe endpoint device with BAR-mapped regions of a functionality stack associated with the host computer to restore the functionality stack associated with the host computer at the shareable PCIe endpoint device. With reference to FIG. 2, the BAR-mapped region 236 of the shareable PCIe endpoint device 115 may be replaced with the BAR-mapped region copy 252 of the first functionality stack 250 of the shareable PCIe endpoint device 115.

At operation 815, the method includes, initializing ID routing tables of the PCIe switch to map the PCIE bus:device:function numbers of the emulated PCIe endpoint device to the PCIe bus:device:function numbers of the shareable PCIe endpoint device during the enumeration of the emulated PCIe endpoint device by the host computer. With reference to FIG. 2, the ID routing tables 222 of the PCIe switch 120 are initialized to map the PCIE bus:device:function numbers of the emulated PCIe endpoint device 140 to the PCIe bus:device:function numbers of the shareable PCIe endpoint device 115 during the enumeration of the emulated PCIe endpoint device 140 by the host computer 105.

At operation 820, the method includes, mapping BAR-mapped regions of the emulated PCIe endpoint device accessed by the host computer to the BAR-mapped regions of the shareable PCIe endpoint device 115. With reference to FIG. 2, after enumeration and initialization have been performed, the BAR-mapped regions of the emulated PCIe endpoint device 140 that have been accessed by the host computer 105, in generating requests targeting the emulated PCIe endpoint device 140, are mapped to the BAR-mapped regions of the shareable PCIe endpoint device 115 during the quantum of time allocated to the host computer 105 by the management server 150.

In various embodiments, the present invention provides an improved system and method for time-based scheduling of a shareable PCIe endpoint device through a PCIe switch.

In various embodiments, portions of the system of the present invention may be implemented in a Field Programmable Gate Array (FPGA) or an Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The method of the present invention may be stored on a computer readable medium which may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of sharing a Peripheral Component Interconnect Express (PCIe) endpoint device with a plurality of host computers, the method comprising:
    allocating, by a management server, a first quantum of time to a first host computer of the plurality of host computers coupled to a PCIe switch, wherein the first quantum of time identifies a duration of time during which the first host computer has exclusive access to second memory transaction layer packets (TLPs) to the shareable PCIe endpoint device coupled to the PCIe switch;
    generating memory TLPs, at the first host computer, targeting a first emulated PCIe endpoint device of the PCIe switch during the first quantum of time allocated to the first host computer;
    redirecting the memory TLPs targeting the first emulated PCIe endpoint device to the shareable PCIe endpoint device during the first quantum of time allocated to the first host computer;
    allocating, by the management server, a second quantum of time to a second host computer of the plurality of host computers, wherein the second quantum of time identifies a duration of time during which the second host computer has exclusive access to send memory TLPs to the shareable PCIe endpoint device;
    generating memory TLPs, at the second host computer, targeting a second emulated PCIe endpoint device of the PCIe switch during the second quantum of time allocated to the second host computer; and
    redirecting the memory TLPs targeting the second emulated PCIe endpoint device to the shareable PCIe endpoint device during the second quantum of time allocated to the second host computer.

2. The method of claim 1, wherein allocating the first quantum of time to the first host computer further comprises:
    selecting, by the management server associated with the PCIe switch, the first host computer and the first quantum of time to be allocated to the first host computer;
    transmitting a host port ID associated with the first host computer to the shareable PCIe endpoint device; and
    transmitting the first quantum of time selected by the management server to the shareable PCIe endpoint device.

3. The method of claim 2, wherein generating memory TLPs, at the first host computer, targeting the first emulated PCIe endpoint device and redirecting the memory TLPs targeting the first emulated PCIe endpoint device to the shareable PCIe endpoint device further comprises:
    generating a start of quantum of time signal at the shareable PCIe endpoint device;
    transmitting the start of quantum of time signal from the shareable PCIe endpoint device to the management server;
    generating a first interrupt at the management server in response to the start of quantum of time signal from the shareable PCIe endpoint device; and
    transmitting the first interrupt to the first host computer.

4. The method of claim 3, further comprising:
    generating an end of quantum of time signal at the shareable PCIe endpoint device after the duration of time identified by the first quantum of time has expired;
    transmitting the end of quantum of time signal to the management server;
    generating a second interrupt at the management server in response to the end of quantum of time signal from the shareable PCIe endpoint device;
    transmitting the second interrupt from the management server to the first host computer; and
    stopping, by the first host computer, generating requests targeting the first emulated PCIe endpoint device in response to the second interrupt received at the first host computer.

5. The method of claim 3, wherein generating memory TLPs, at the first host computer, targeting the first emulated PCIe endpoint device in response to the first interrupt further comprises, the first host computer accessing a BAR-mapped region of the first emulated PCIe endpoint device in response to the first interrupt.

6. The method of claim 5, further comprising, prior to generating memory TLPs at the second host computer:
    saving a current state of the BAR-mapped regions of the shareable PCIe endpoint device;
    replacing the BAR-mapped regions of the shareable PCIe endpoint device with BAR-mapped regions of a functionality stack associated with the second host computer to switch the functionality stack associated with the host computer at the shareable PCIe endpoint device;
    initializing ID routing tables of the PCIe switch to map the PCIe bus:device:function numbers of the second emulated PCIe endpoint device to the PCIe bus:device:function numbers of the shareable PCIe endpoint device; and
    mapping the BAR-mapped regions of the second emulated PCIe endpoint device to the BAR-mapped regions of the shareable PCIe endpoint device.

7. The method of claim 1, further comprising, prior to allocating the first quantum of time to the first host computer:

transmitting, by the first host computer, configuration TLPs to perform enumeration of shareable PCIe endpoint devices and the PCIe switch;

capturing, by the management server, the configuration TLPs transmitted from the first host computer;

responding to the configuration TLPs transmitted from the first host computer by establishing the first emulated PCIe endpoint device; and exposing, by the first emulated PCIe endpoint device, PCIe vendor defined capability to the first host computer.

8. The method of claim 7, further comprising:

enumerating, by the management server, the PCIe switch and the shareable PCIe endpoint device to expose a PCIe vendor defined scheduling control capability to the management server.

9. A system for sharing a Peripheral Component Interconnect Express (PCIe) endpoint device with a plurality of host computers, the system comprising:

a PCIe switch;

a plurality of host computers coupled to the PCIe switch, the plurality of host computers including a first host computer and a second host computer;

a shareable PCIe endpoint device coupled to the PCIe switch;

a management server associated with the PCIe switch, the management server to establish a first emulated PCIe endpoint device and a second emulated PCIe endpoint device within the PCIe switch, allocate a first quantum of time to the first host computer, wherein the first quantum of time identifies a duration of time during which the first host computer has exclusive access to send memory transaction layer packets (TLPs) to the shareable PCIe endpoint device, allocated a second quantum of time to the second host computer, wherein the second quantum of time identifies a duration of time during which the second host computer has exclusive access to send memory TLPs to shareable PCIe endpoint device, the PCIe switch to redirect memory TLPs generated from the first host computer targeting the first emulated PCIe endpoint device to the shareable PCIe switch during the first quantum of time and to redirect memory TLPs generated from the second host computer targeting the second emulated PCIe endpoint device to the shareable PCIe switch during the second quantum of time.

10. The system of claim 9, wherein the first emulated PCIe endpoint device exposes a PCIe vendor defined capability to the first host computer during an enumeration process.

11. The system of claim 9, wherein the shareable PCIe endpoint device further comprises:

a PCIe configuration space exposing a PCIe vendor defined scheduling control capability to the management server, the PCIe configuration space further comprising a R/W processing unit having BAR-mapped regions, wherein the R/W processing unit converts a memory TLP received at the shareable PCIe endpoint device into a corresponding R/W request;

a host ID appending unit coupled to the R/W processing unit, the host ID appending unit to append a host port ID associated with the first host computer to the R/W request to generate a corresponding R/W request with host port ID;

a plurality of functionality stacks including a first functionality stack associated with the first host computer and a second functionality stack associated with the second host computer; and a functionality stack switching module coupled to the host ID appending unit, the functionality stack switching module for switching the functionality stack to be used by the shareable PCIe endpoint device using a BAR-mapped region copy of the first functionality stack or a BAR-mapped copy of the second functionality stack.

12. The system of claim 11, wherein the first functionality stack comprises a host port ID to DMA address appending module to prefix the host port ID associated with the first host port to DMA addresses for forwarding to the first host computer.

13. The system of claim 9, wherein the management server is further configured to:

select the first host computer and select the first quantum of time to be allocated to the first host computer;

transmit a host port ID associated with the first host computer to the shareable PCIe endpoint device; and transmit the first quantum of time to the shareable PCIe endpoint device.

14. The system of claim 13, wherein the shareable PCIe endpoint device is further configured to:

receive the transmitted first quantum of time from the management server;

generate a start of quantum of time signal indicating a start of the first quantum of time;

transmit the start of quantum of time signal to the management server;

generate a first interrupt at the management server in response to the start of quantum of time signal from the shareable PCIe endpoint device; and transmit the first interrupt to the first host computer.

15. The system of claim 14, wherein the first host computer is further configured to:

generate the memory TLPs targeting the first emulated PCIe endpoint device in response to receiving the first interrupt.

16. The system of claim 15, wherein the shareable PCIe endpoint device is further configured to:

generate an end of quantum of time signal indicating an end of the first quantum of time after the duration of time identified by the first quantum of time has expired; and transmit the end of quantum of time signal to the management server.

17. The system of claim 16, wherein the management server is further configured to:

receive the end of quantum of time signal;

generate a second interrupt in response to the end of quantum of time signal from the shareable PCIe endpoint device; and transmit the second interrupt from the management server to the first host computer through the emulated PCIe endpoint device.

18. The system of claim 17, wherein the first host computer is further configured to:

receive the second interrupt; and stop transmitting memory TLPs targeting the first PCIe endpoint device in response to the second interrupt.

19. The system of claim 18, wherein the PCIe switch is further configured to stop redirecting the memory TLPs generated from the first host computer targeting the first emulated PCIe endpoint device to the shareable PCIe switch in response to the end of quantum of time interrupt.

* * * * *

UNITED STATES PATENT AND TRADEMARK OFFICE
CERTIFICATE OF CORRECTION

PATENT NO. : 11,449,456 B2
APPLICATION NO. : 17/151316
DATED : September 20, 2022
INVENTOR(S) : Derin Jose, Sachindranath Pv and Viswas G Page 1 of 1

It is certified that error appears in the above-identified patent and that said Letters Patent is hereby corrected as shown below:

In the Claims

In Column 19, Line 41, "second" should read --send--.

Signed and Sealed this
Eighth Day of November, 2022

Katherine Kelly Vidal
*Director of the United States Patent and Trademark Office*